US012655602B2

(12) United States Patent
Guillemette

(10) Patent No.: US 12,655,602 B2
(45) Date of Patent: Jun. 16, 2026

(54) SNUBBER APPARATUS FOR EARTH-WORKING BUCKET

(71) Applicant: 9257-5810 QUÉBEC INC., Plessisville (CA)

(72) Inventor: Jessy Guillemette, Plessisville (CA)

(73) Assignee: 9257-5810 QUÉBEC INC., Plessisville (CA)

( * ) Notice: Subject to any disclaimer, the term of this patent is extended or adjusted under 35 U.S.C. 154(b) by 442 days.

(21) Appl. No.: 17/746,321

(22) Filed: May 17, 2022

(65) Prior Publication Data

US 2022/0372727 A1 Nov. 24, 2022

Related U.S. Application Data

(60) Provisional application No. 63/190,842, filed on May 20, 2021.

(51) Int. Cl.
E02F 3/407 (2006.01)
F16F 9/14 (2006.01)

(52) U.S. Cl.
CPC ............ E02F 3/4075 (2013.01); F16F 9/145 (2013.01); F16F 2232/02 (2013.01)

(58) Field of Classification Search
CPC ...... E02F 3/4075; F16F 9/145; F16F 2232/02
See application file for complete search history.

(56) References Cited

U.S. PATENT DOCUMENTS

| | | | | | |
|---|---|---|---|---|---|
| 1,843,603 | A | * | 2/1932 | Houdaille | F16F 9/145 188/314 |
| 1,942,658 | A | | 1/1934 | Mitchell | |
| 2,019,974 | A | * | 11/1935 | Houdaille | F16F 9/145 267/227 |
| 3,698,521 | A | * | 10/1972 | Taylor | F16F 5/00 188/306 |
| 5,125,809 | A | * | 6/1992 | Hartley | F04C 9/005 418/153 |
| 5,152,189 | A | * | 10/1992 | Miura | F16F 9/145 464/24 |

(Continued)

FOREIGN PATENT DOCUMENTS

GB 391779 A * 4/1933 ............. F16F 9/145

*Primary Examiner* — Nicholas J Lane
(74) *Attorney, Agent, or Firm* — NORTON ROSE FULBRIGHT CANADA LLP

(57) ABSTRACT

An apparatus may have a casing defining an inner cavity delimited at least by a circumferential surface portion between a pair of lateral surface portions. A shaft passes through the inner cavity of the casing. A wiper arm rotates with the shaft, the wiper arm having a free end in close proximity to the surface portions of the inner cavity of the casing, the free end of the wiper arm having a contour complementarily corresponding to a profile of the circumferential surface portion of the inner cavity. A dam divides the inner cavity in chambers adapted to accommodate a fluid, with movements of the wiper arm changing the volume of the chambers, whereby the apparatus is configured to allow the fluid to flow between the chambers to oppose the force to the given motions. A cover plate(s) is connected to a lateral side of the casing and defining at least one outer chamber around the at least one end of the shaft and exteriorly of the inner cavity.

9 Claims, 9 Drawing Sheets

(56)     References Cited

U.S. PATENT DOCUMENTS

| | | | | |
|---|---|---|---|---|
| 5,735,067 | A | * | 4/1998 | Isley ..................... E02F 3/4075 37/444 |
| 2008/0105506 | A1 | * | 5/2008 | Norman ................ B62K 21/08 188/310 |
| 2012/0260538 | A1 | * | 10/2012 | Schob ................... E02F 3/4075 188/308 |
| 2014/0102841 | A1 | * | 4/2014 | Pilon .................... E02F 3/4075 188/306 |
| 2016/0319847 | A1 | | 11/2016 | Kettleborough |
| 2018/0087593 | A1 | * | 3/2018 | Popp ...................... E02F 3/401 |
| 2024/0218913 | A1 | * | 7/2024 | Tanaka ..................... F16F 9/14 |

* cited by examiner

SNUBBER APPARATUS FOR EARTH-WORKING BUCKET

CROSS-REFERENCE TO RELATED APPLICATION

The present application claims the priority of U.S. Patent Application No. 63/190,842, filed on May 20, 2021, and incorporated herein by reference.

FIELD OF THE APPLICATION

The present application relates to snubber apparatuses for damping movements of doors on an earth-working bucket, also known as an excavator bucket, for instance.

BACKGROUND OF THE ART

Some commonly used excavators have an excavation bucket mounted at the end of a boom. The excavation bucket has an open front side, with a door on its rear side. The lower edge of the open front side has teeth for excavating.

The excavator first scoops up dirt with the rear-side door of the bucket closed. The boom then moves so that the bucket is above a dropping zone (e.g., a truck), at which point the rear-side door of the bucket faces downward. The door is then opened, for instance by the release of a latch. The door opens under its weight and the weight of the dirt in the bucket, whereby the dirt is dumped. To close the door, a latch grabs the door when the excavation bucket is moved to scoop up another load of dirt.

Because of its weight and large movement spans, the door of the excavation bucket could be subjected to violent impacts when closing. Accordingly, snubbers also known as brakes, hydraulic brakes, dampers, mechanical snubbers, etc, are used to reduce oscillation of the door and slow down its movement, therefore reducing the impact at closing of the door.

Hydraulic snubbers feature a pair of chambers separated by a wiper, with the wiper moving with the excavation door to change the volume of the chambers. A fluid (e.g., hydraulic oil) moves between chambers, and this flow is controlled to oppose torque to the movement of the door. However, the various components of such hydraulic snubbers are subjected to high pressures and wear, in addition to being exposed to the elements (e.g., temperature variations), which may affect the performance and durability of the snubbers.

SUMMARY OF THE APPLICATION

It is therefore an aim of the present disclosure to provide an apparatus that addresses issues associated with the prior art.

Therefore, in accordance with a first aspect of the present application, there is provided an apparatus comprising: a casing defining an inner cavity delimited at least by a circumferential surface portion between a pair of lateral surface portions; a shaft passing through the inner cavity of the casing and rotatably supported to rotate about its longitudinal axis, the shaft having at least one end laterally projecting out of the casing, the at least one end of the shaft adapted to be connected to a moving part to oppose a force to given motions of the moving part; a wiper arm on the shaft so as to rotate with the shaft, the wiper arm having a free end in close proximity to the surface portions of the inner cavity of the casing, the free end of the wiper arm having a contour complementarily corresponding to a profile of the circumferential surface portion of the inner cavity; a dam extending from the circumferential surface portion toward a center of the inner cavity of the casing in close proximity to one of the shaft and wiper arm, to divide the inner cavity in chambers adapted to accommodate a fluid, with movements of the wiper arm changing the volume of the chambers, whereby the apparatus is configured to allow the fluid to flow between the chambers to oppose the force to the given motions; and at least one cover plate connected to a lateral side of the casing and defining at least one outer chamber around the at least one end of the shaft and exteriorly of the inner cavity.

In accordance with a second aspect, there is provided an apparatus comprising: a casing defining an inner cavity delimited at least by a circumferential surface portion between a pair of lateral surface portions; a shaft passing through the inner cavity of the casing and rotatably supported to rotate about its longitudinal axis, the shaft having at least one end laterally projecting out of the casing, the at least one end of the shaft adapted to be connected to a moving part to oppose a force to given motions of the moving part; a wiper arm on the shaft so as to rotate with the shaft, the wiper arm having a free end in close proximity to the surface portions of the inner cavity of the casing, the free end of the wiper arm having a contour complementarily corresponding to a profile of the circumferential surface portion of the inner cavity, wherein the wiper arm has a tubular portion mounted to the shaft, and a wiper portion forming the free end, the wiper portion being releasably connected to the tubular portion; and a dam extending from the circumferential surface portion toward a center of the inner cavity of the casing in close proximity to the wiper arm, to divide the inner cavity in chambers adapted to accommodate a fluid, with movements of the wiper arm changing the volume of the chambers, whereby the apparatus is configured to allow the fluid to flow between chambers to oppose the force to the given motions.

In accordance with a third aspect, there is provided an apparatus comprising: a casing defining an inner cavity delimited at least by a circumferential surface portion between a pair of lateral surface portions; a shaft passing through the inner cavity of the casing and rotatably supported to rotate about its longitudinal axis, the shaft having at least one end laterally projecting out of the casing, the at least one end of the shaft adapted to be connected to a moving part to oppose a force to given motions of the moving part; a wiper arm on the shaft so as to rotate with the shaft, the wiper arm having a free end in close proximity to the surface portions of the inner cavity of the casing, the free end of the wiper arm having a contour complementarily corresponding to a profile of the circumferential surface portion of the inner cavity; and a dam extending from the circumferential surface portion toward a center of the inner cavity of the casing in close proximity to one of the shaft and wiper arm, to divide the inner cavity in chambers adapted to accommodate a fluid, with movements of the wiper arm changing the volume of the chambers, whereby the apparatus is configured to allow the fluid to flow between the chambers to oppose the force to the given motions; wherein the free end of the wiper arm has planar surfaces tapering radially outwardly relative to a plane in which the longitudinal axis lies, the plane passing through the wiper arm.

In accordance with a fourth aspect, there is provided a bucket comprising at least one of the apparatuses as describe above.

DESCRIPTION OF THE PREFERRED EMBODIMENTS

Figure 1:
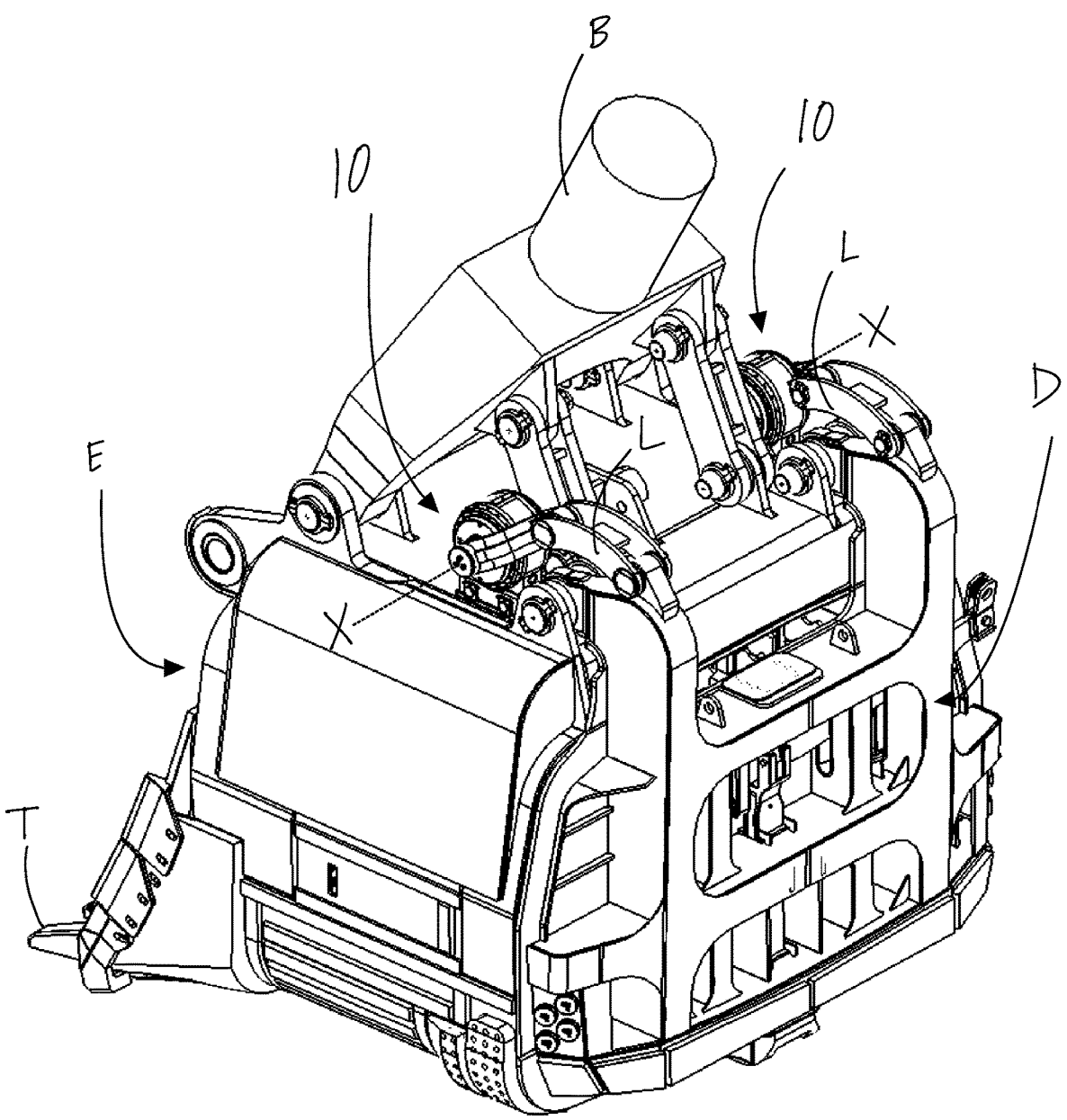
FIG. 1 is a perspective view of a earth-working bucket with snubber apparatuses in accordance with an embodiment of the present disclosure.
Figure 2:
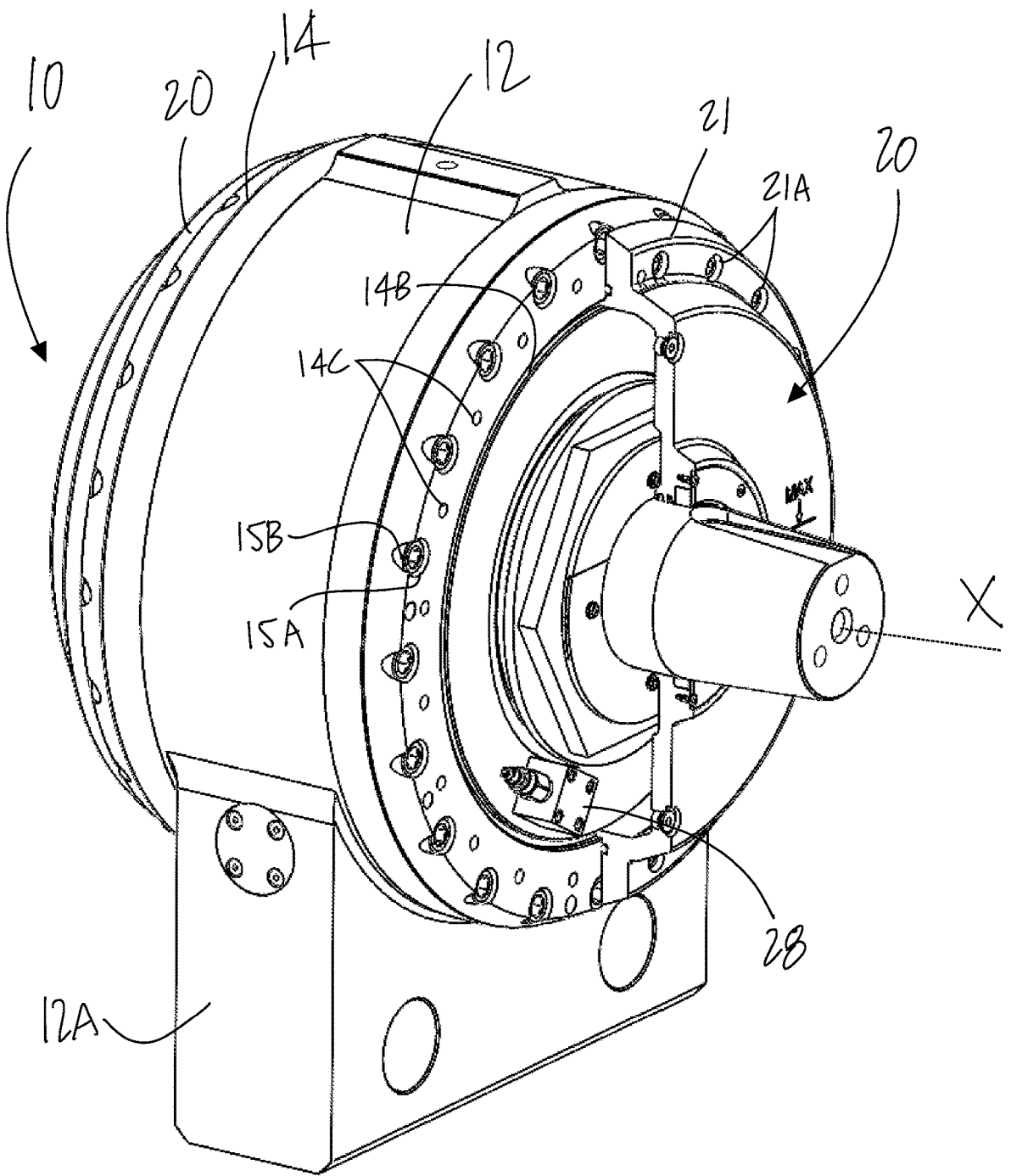
FIG. 2 is a perspective view of a snubber apparatus in accordance with an embodiment of the present disclosure, with a cover plate fragmented.

Referring to the drawings and more particularly to FIGS. 1 and 2, there is illustrated an excavation bucket E of the type that may be mounted at the end of a boom B. The excavation bucket E has an open front side, while a door D is on its rear side. The door D is pivotally mounted to the bucket E. The lower edge of the open front side has teeth T for excavating, as an option among others.

A pair of snubber apparatuses 10 in accordance with the present disclosure are mounted to the bucket E, though one or more snubber apparatuses 10 could be used. Moreover, while the snubber apparatuses 10 are mounted on the illustrated type of bucket E, other equipment may use one or more of the snubber apparatuses 10. In the shown arrangement, rotational axes X may be collinear, but other arrangements are possible. The snubber apparatuses 10 are of the type used in conjunction with an excavation bucket to dampen movements of the bucket door D, as known in the art, by way of linkages L. The snubber apparatus 10 may also be known as a damper, snubber, hydraulic brake, among other possible names. Any appropriate linkage configuration (single, double or Y-shaped) may be used to convert an opening/closing movement of the door D to a rotation of the shafts of the snubber apparatus(es) 10. In a variant, the snubber apparatus(es) 10 could have a rotational axis coincident with the door's rotational axis.

Referring now to FIG. 2, a single one of the snubber apparatuses 10 is shown. The snubber apparatus 10 has a casing including a casing portion 12 and optionally end plate(s) 14. The casing portion 12 defines a structural component of the snubber apparatus 10, and is fixed to the excavation bucket E in conventional fashion, for instance by its block base 12A. Other attachment systems may be considered as well, with flanges, brackets, and the like being some of the possible configurations. End plates 14 are connected to opposite lateral sides of the casing portion 12, to form an inner cavity of the snubber apparatus 10, and may be said to be part of the casing. The lateral sides of the casing portion 12 may include fasteners holes 12B, such as threaded holes. In an embodiment, the end plate 14 on one side of the casing portion 12 is integral with the casing portion 12 (e.g., monoblock). In another embodiment, fasteners extend from side to side to retain both end plates 14.

Figure 3:
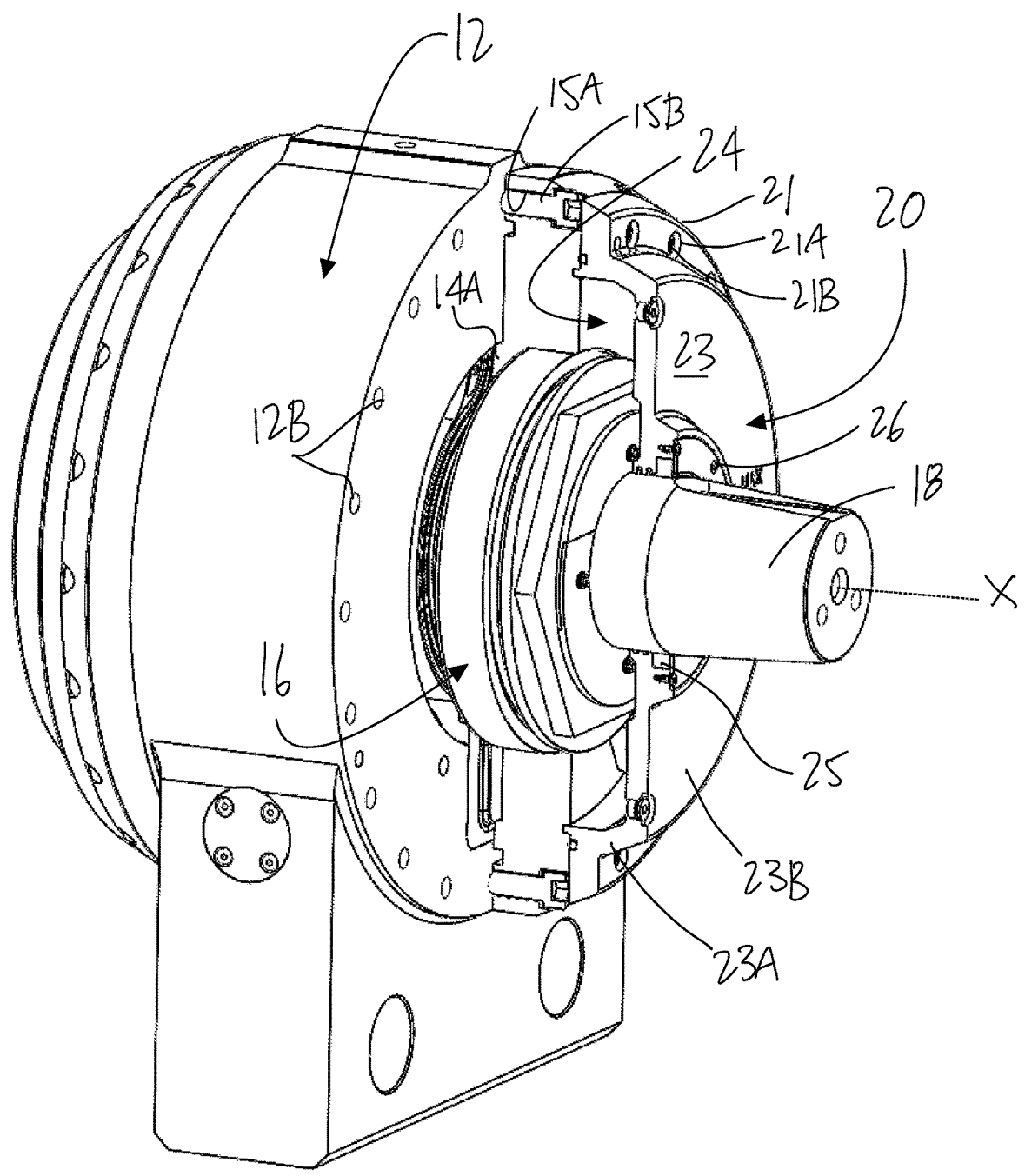
FIG. 3 is a perspective view of the snubber apparatus of FIG. 2, with the cover plate and an end plate fragmented.
Figures 4, 5:
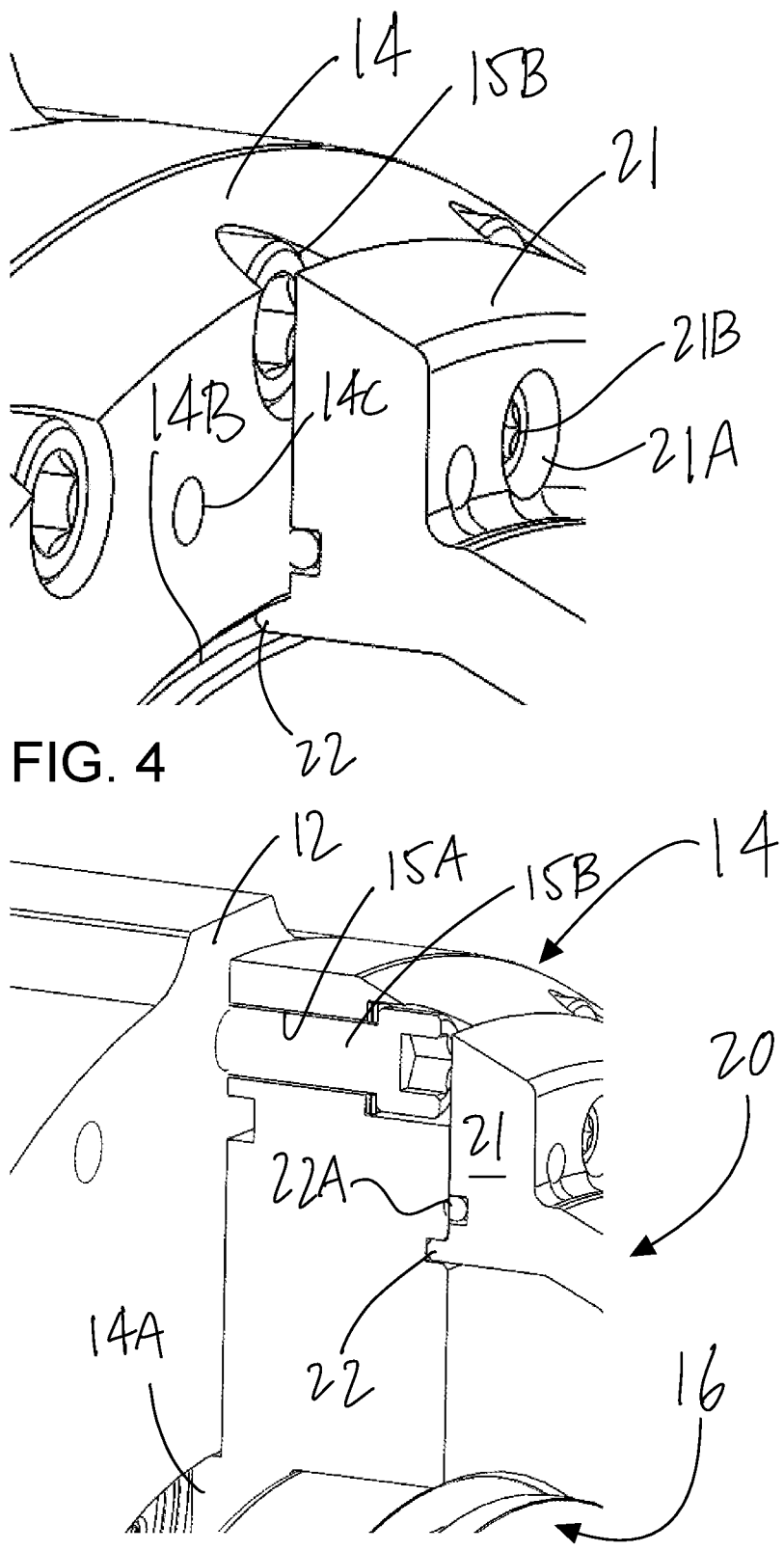
FIG. 4 is an enlarged view of the snubber apparatus as fragmented in FIG. 2.
FIG. 5 is an enlarged view of the snubber apparatus as fragmented in FIG. 3.

The end plates 14 may both be annular in shape, for a snubber configuration as shown in FIG. 2 in which ends of a shaft project out of both end plates 14, i.e., they may have a bore, such as a central bore, for the shaft to pass through the end plates 14. However, the snubber apparatus 10 may have a shaft with a single projecting end as well. The end plates 14 may optionally have a central neck 14A, the central neck 14A received in the casing portion 12 when assembled, as shown in FIGS. 3 and 5. The penetration of the central neck 14A in the cavity of the casing portion 12 may block radial movement of the end plate 14 relative to the casing portion 12 and/or may contribute to a stiffer assembly, with a generally oil-tight joint being formed between the casing portion 12 and the end plate(s) 14. The central neck 14A may also thicken the end plate 14 at the location of a bearing, with a counterbore-like receptacle opposite the central neck 14A being provided as an option, as observed from FIG. 3. The central neck 14A may be integrally formed with a remainder of the end plate 14, for instance as a casting or machined from monoblock. One or more annular groove 14B may optionally be present on a surface of the end plate 14 facing away from the casing portion 12. As an alternative or supplement to the annular groove 14B, an annular lip may be present. A series of holes 14C may be located radially outward of the annular groove 14B, for instance in a circumferential distribution. The holes 14C may be threaded. The holes 14C may be provided to secure cover plates to the end plates 14, as detailed below. Other assembly means are considered.

Still referring to FIG. 2, another series of holes 15A may be circumferentially distributed in the end plates 14, for instance near an outer periphery. The holes 15A may receive fasteners 15B, such as bolts, by which the end plates 14 are fixed to the casing portion 12, or fixed to one another while passing through throughbores in the casing portion 12. The fasteners 15B may be threadingly engaged into the holes 12B of the casing portion 12. When the end plates 14 are fixed to the casing portion 12, there is coplanar abutment, and a rotational axis X may be normal to a plane of abutment between the end plate 14 and the casing portion 12. The holes 15A may have a counterbore, a countersink, for the fasteners 15B to be concealed within a plane of the end plates 14.

The end plates 14 each have a housing for receiving a bearing assembly 16. Accordingly, the bearings 16 rollingly support a snubber shaft 18, such that the snubber shaft 18 may rotate along its longitudinal axis, aligned with the rotational axis X. In an embodiment, the bearing assemblies include tapered roller bearings, although other types of bearings may be used as well. As will be described hereinafter, tapered roller bearings are well suited to be used with the snubber apparatus 10. Moreover, as observed in the figures, the bearing assemblies 16 may include washer(s), hexagonal rings, etc.

Appropriates seals are provided between the various components set forth above, to ensure that the snubber apparatus 10 is relatively leakproof, and thus to keep a fluid inside the snubber apparatus 10. The seals must be compatible with the type of fluid used and associated pressures. For instance, the seals may be O-rings, among other possibilities, and are positioned between the end plates 14 and the casing portion 12, for example.

Although not fully visible, the shaft 18 may have a pair of ends projecting outwardly from the end plates 14, for connection with the linkages L (FIG. 1). In an embodiment, a central axial plane, to which the rotational axis X is normal, may separate the snubber apparatus 10 in two mirror images of one another. The mirror images may not be perfectly identical. The shaft 18 could also have a single projecting end as well.

Referring to FIGS. 2 to 5, cover plates 20 are shown as being mounted to the end plates 14, but they could also be mounted directly to the casing portion 12. The cover plates contribute in defining a sealing zone over the junction between the bearing assemblies 16, shaft 18 and end plates 14. The cover plates 20 may be on both sides of the snubber apparatus 10, or may be on a single side. The cover plates 20 may be circular to emulate a shape of the end plates 14, but other shapes are considered. The cover plates 20 may have a ring portion 21 that is in coplanar abutment with a surface of the respective end plate 14. Another series of holes 21A may be defined in the ring portion 21. The holes 21A may be provided adjacent to an outer periphery of the ring portion 21, to secure the cover plates 20 to the end plates 14, using fasteners 21B, such as bolts, screws, or the like, that may be received in the holes 14C (FIG. 2). Other assembly means are considered. The holes 21A may optionally have a counterbore, a countersink, etc.

Referring to FIGS. 4 and 5, a lip 22 may optionally project from a surface of the ring portion 21. The lip 22 may be annular, and is sized to penetrate into the annular groove 14B. The mating engagement between the lip 22 and the annular groove 14B forms a barrier to reduce a risk of leakage. A reverse arrangement is possible, with a lip on the end plate 14 and an annular groove in the cover plate 20, or lips and annular grooves may be in both. A seal or seals 22A may be adjacent to the lip 22 to contribute to the sealing of the sealing zone. The seal(s) 22A may be in a groove in the surface of the ring portion 21 and/or in a reverse arrangement with the seal(s) 22A being in a groove on the abutment surface of the end plate 14. In a variant, the seal 22A is radially outward of the lip 22. The combination of lip 22 and annular groove 14B may also add stiffness to the connection between the end plate 14 and the cover plate 20.

The cover plate 20 may further include a dome portion 23 located inward of the ring portion 21. The dome portion 23 defines the sealing zone that covers the junction between the bearing assemblies 16, shaft 18 and end plates 14. The dome portion 23 may have a side wall 23A and an end wall 23B, to define an outer chamber 24 with the end plate 14, for receiving oil. The moniker "outer" may be used to describe the chamber 24 as it is exteriorly off the inner cavity 30. A central bore 25 may be in the end wall 23B, with the shaft 18 passing through the central bore 25 for connecting with the linkage L (FIG. 1)—the bore 25 may not need to be central. In an embodiment, the central bore 25 is in an annular reinforcement 26 of the end wall 23B. The annular reinforcement 26 may strengthen the cover plate 20. Moreover, the annular reinforcement 26 may increase an axial overlap between the central bore 25 and the shaft 18. Also, the cover plates 20 increase a support span on the shaft 18. Stated differently, a greater length of the shaft 18 is supported, in comparison to snubbers without the cover plates 20. The cover plates 20 may provide structural support for the shaft 18, contributing to lessening a deflection of the shaft 18 in comparison to shorter support lengths. The cover plates 20 may have a monoblock construction, for the ring portion 21, the dome portion 23 and the annular reinforcement 26, but other arrangements, such as a welded assembly, a fastened assembly, may also be used.

Figure 6:
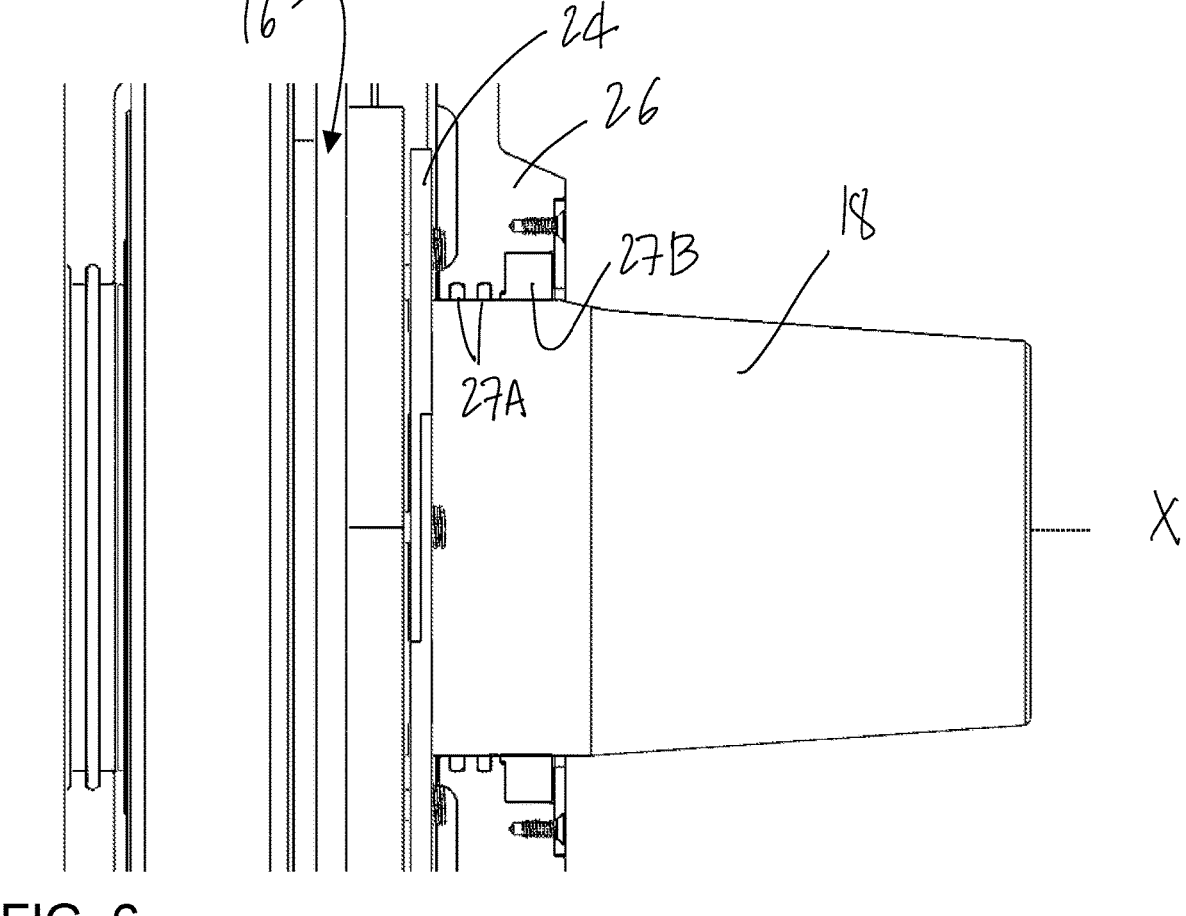
FIG. 6 is an elevation view of the snubber apparatus as fragmented in FIG. 2.

Seals 27A and 27B may be in an inner annular surface of the central bore 25, as best seen in FIG. 6. A pair of seals 27A are oil seals, that are provided to retain oil in the chamber 24. In an embodiment, a space between the seals

27A is present, to act as an expansion zone when the snubber apparatus 10 performs a braking action. The expansion zone may assist in keeping oil in the snubber apparatus 10 in instance of hammer. The seal 27B may be a wiper seal blocking contaminants from penetrating into the chamber 24.

Consequently, the chamber 24 may receive and contain oil. The oil in the chamber 24 may not be pressurized, and forms a buffer over the end plate 14. The buffer protects an interior of the casing portion 12. If oil from the casing portion 12 leaks through the junction between the bearing assemblies 16, shaft 18 and end plates 14, it may accumulate in the oil buffer defined by the chamber 24. The oil buffer in the chamber 24 may also define a protection layer for the bearing assembly 16, shielding them from contaminants such as dust and sand. The oil buffer also ensures that the bearing assembly 16 is suitably lubricated, for instance by the bearing assembly 16 being exposed to the outer chamber 24.

As shown in FIG. 2, a flow control device 28 may be present, so as to transfer oil back to the inner cavity 30 of the casing portion 12. The flow control device 28 may be a check valve, relief valve or other component to allow oil flow from the chamber 24 into the casing portion 12. The flow control device 28 opens at a relatively low pressure to allow a balancing of oil pressure between the casing portion 12 and the chamber 24.

In an embodiment, the chamber 24 is not devised to be filled with oil. Instead, the chamber 24 may be an air chamber. The cover plates 20 in such configurations still form a shield for the bearing assemblies 16, and contribute to the support of the shaft 18.

Figure 7:
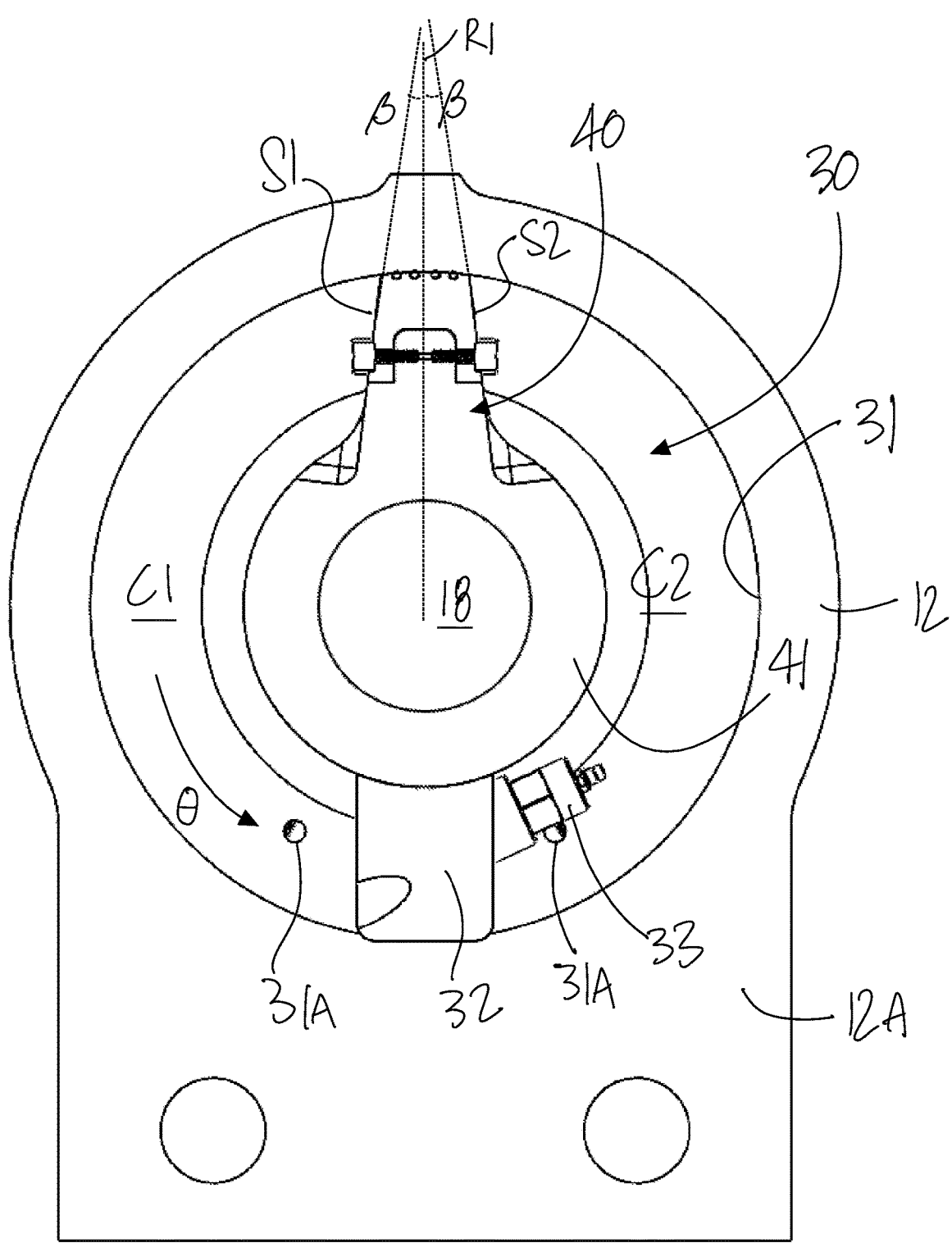
FIG. 7 is a schematic view of an interior of the snubber apparatus of FIG. 2.

Referring now to FIG. 7, the casing portion 12 has an inner cavity 30 that has a generally circular shape in an axial plane (the axial plane of FIG. 7 being coplanar to the sheet of FIG. 7, and having a rotational axis normal thereto). The inner cavity 30 may have an outer circumferential surface portion 31 being that of a torus, between lateral surface portions defined by the end plates 14 (e.g., by the central necks 14A if present). However, the circumferential surface portion 31 may adopt any arcuate profile (ellipse, square, etc) extending from one of the lateral surface portion to the other of the lateral surface portion of the inner cavity 30, as alternatives to the semi-circular profile of the torus. A port 31A may be present and in fluid communication with the flow control device 28 (FIG. 2). A dam 32 (a.k.a., fixed arm or the like) projects inwardly from the circumferential surface portion 31, in a radial inward direction. The dam 32 may have an end shaped as a function of the shape of the circumferential surface portion 31. A keyway could alternatively be present to receive an end of the dam 32. Another flow control device 33 may be connected to the dam 32, to contribute to controlling a flow through the dam 32. The flow control device 33 may be part of an hydraulic network or circuit.

The dam 32 is shown projecting toward a wiper arm 40. A free end of the dam 32 is in close proximity (i.e., in contact or separated by a small gap) to a cylindrical or quasi-cylindrical surface of the wiper arm 40 or to the shaft 18, for example with complementary shapes. In an embodiment, seal(s) (not shown) on the free end of the dam 32 contact the surface of the wiper arm 40.

Figure 8:
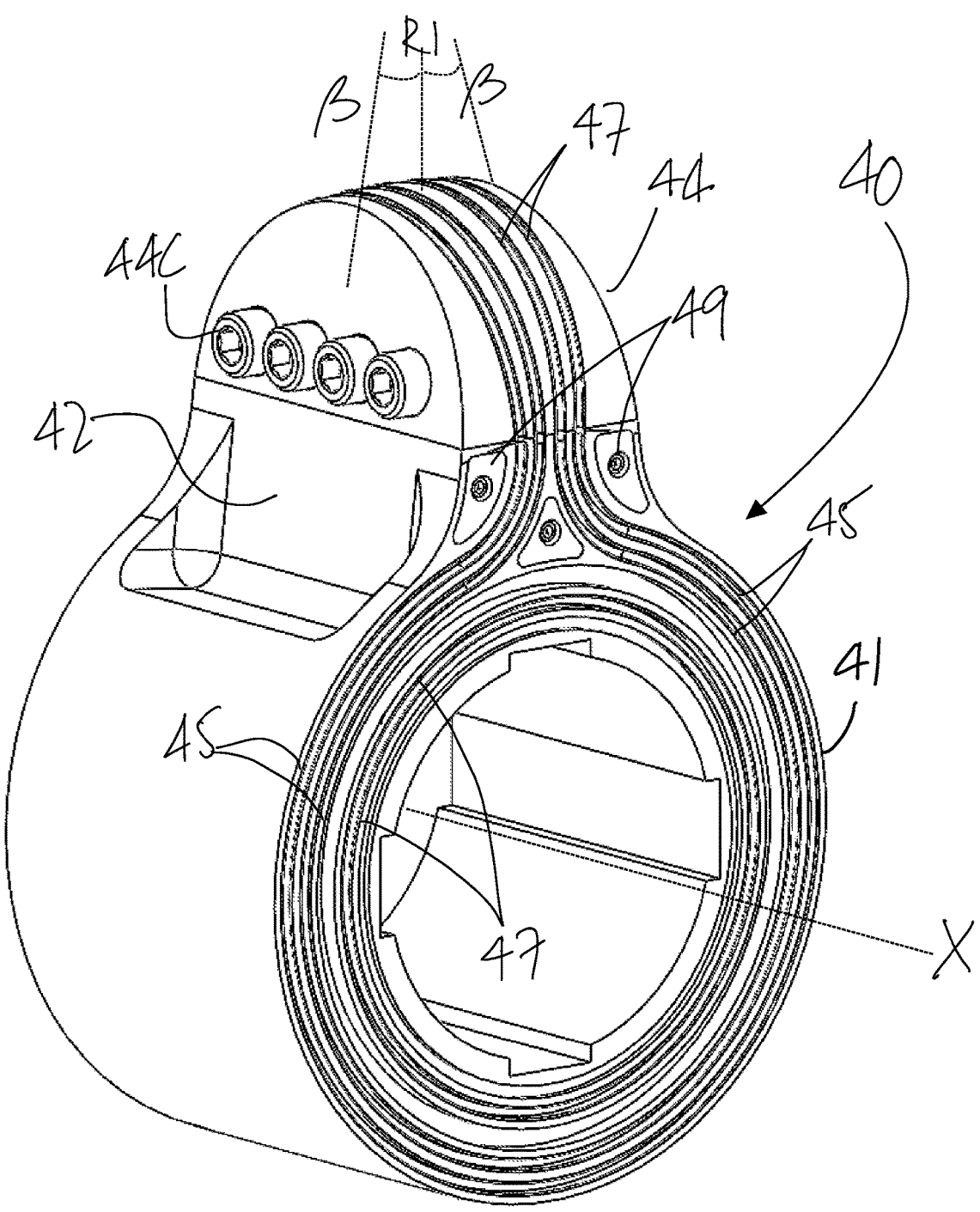
FIG. 8 is a perspective view of a variant of a wiper arm of the snubber apparatus of FIG. 2.
Figure 9:
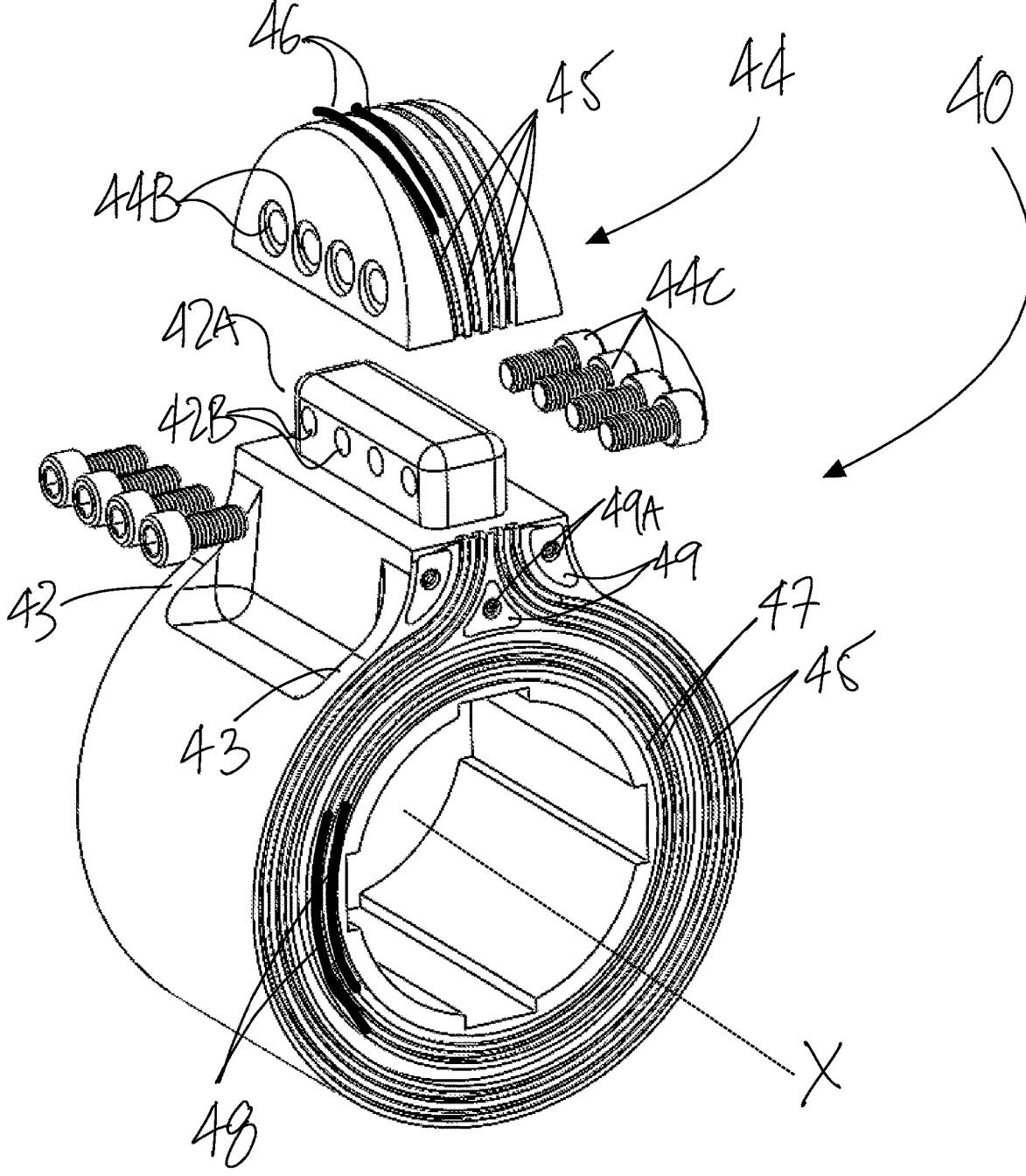
FIG. 9 is an assembly view of the wiper arm of FIG. 8.
Figure 10:
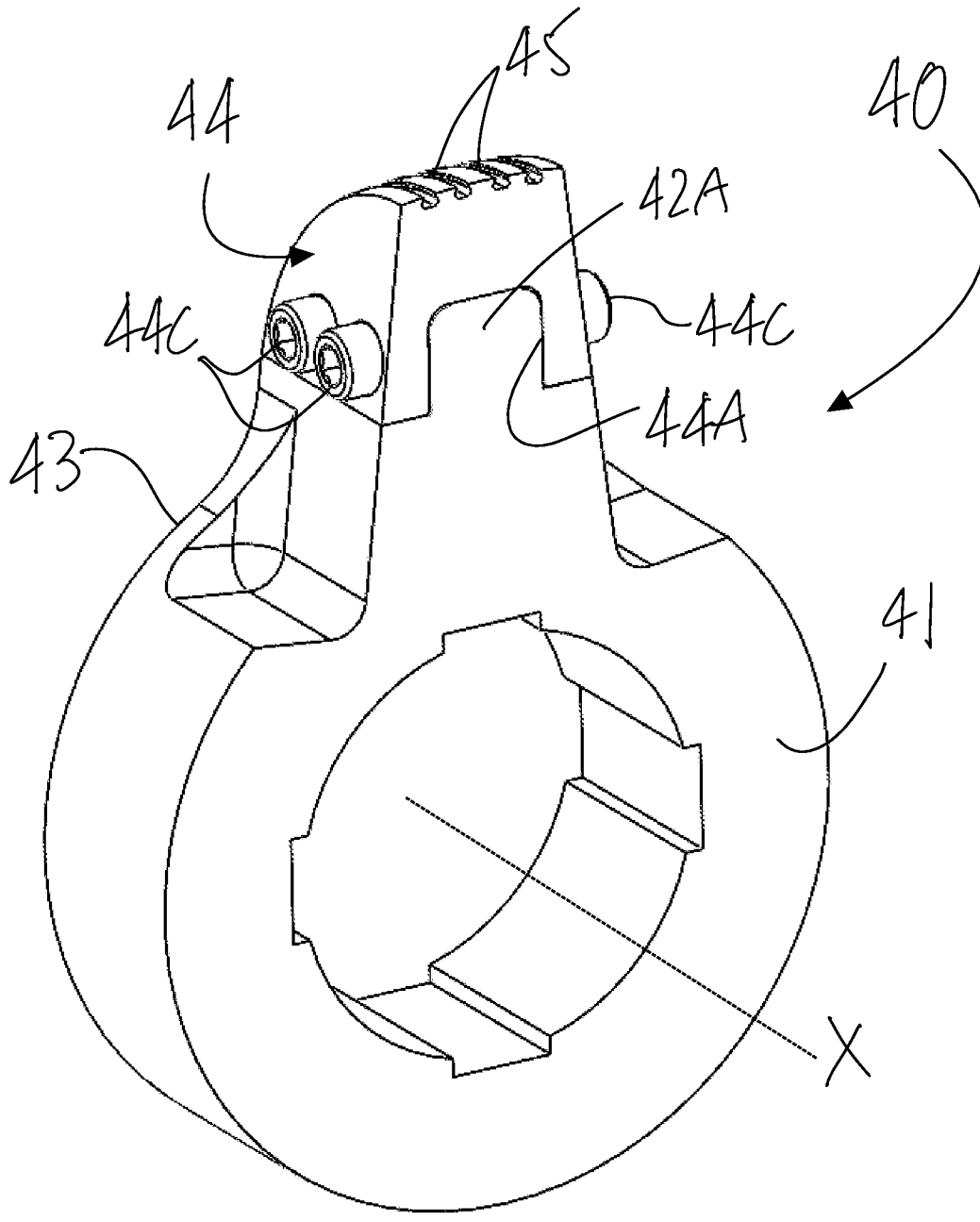
FIG. 10 is a cross-section view of the wiper arm of FIG. 8.

Referring to FIGS. 8 to 10, the wiper arm 40 may have a quasi-cylindrical tubular portion 41 (defining the quasi-cylindrical surface) that is mounted to the shaft 18. As an alternative, the wiper arm 40 may be a flap mounted directly to the shaft 18, without the tubular portion 41. A bore in the tubular portion 41 is shaped as a function of the corresponding section of the shaft 18. As illustrated, the bore of the wiper arm 40 may use keyway(s). The keyway(s) configurations allows some form of translation of the wiper arm 40 along the shaft 18, with integral rotation of the shaft with the wiper arm 40. However, other similar configurations are also considered such as splines and other mechanical connections, for the integral rotation of the shaft 18 and wiper arm 40.

A block 42 may project radially from the tubular portion 41, disrupting the cylindricality of the tubular portion 41. The block 42 may narrow into a neck 42A (FIG. 9). The neck 42A may for instance have a rectangular prism shape, though other shapes may be considered as well. Holes 42B may be defined in the neck 42A. The holes 42B may be threaded, and may be tangentially oriented, as a possibility among others (i.e., longitudinal axes of the holes 42B intersecting an imaginary circle centered on rotational axis X in a tangential manner). Ribs 43 may be at a junction between the cylindrical surface of the tubular portion 41 and the block 42, to strengthen the connection therebetween. In an embodiment, the tubular portion 41 including the block 42 is a monoblock component.

The wiper arm 40 has a wiper portion 44 (i.e., its free end) projecting from the tubular portion 41. As shown in FIG. 10, the wiper portion 44 may be a removable component, that may be secured to the neck 42A. Accordingly, if the wiper portion 44 is removable, it defines a receptacle 44A (FIG. 10) configured to snuggly receive the neck 42A, in a male-female connection, with the male component that could also be on the wiper portion 44 in a reverse arrangement. Other non male-female couplings are considered. Holes 44B, such as counterbore holes, may be located in a surface of the wiper portion 44, and aligned with the holes 42B in the neck 42A, for fasteners 44C to lock the assembly (e.g., bolts, screws, etc). Tolerances are taken into consideration for the junction between the tubular portion 41 and the wiper portion 44 to be continuous, and seamless-like. The wiper portion 44 abuts against a shoulder surface of the block 42, surrounding the neck 42A, such that the junction is generally oil-tight. As an embodiment, a seal could also be added between the shoulder surface of block 42 and wiper portion 44.

The wiper portion 44 of the wiper arm 40 is in close proximity (i.e., in contact or separated by a small gap) with the circumferential surface portion 31 of the inner cavity 30 of the casing portion 12. The free end of the wiper arm 40 has a contour corresponding to the profile of the circumferential surface portion 31 of the inner cavity 30. Moreover, as seen in FIG. 8, the wiper arm 40 may define a continuous surface that includes radial surface portions of the tubular portion 41 of the wiper arm 40 and the arcuate contour. According to an embodiment, the arcuate contour of the wiper portion 44 is semicircular. Other embodiments are possible, with separate surfaces, as opposed to a single continuous surface.

One or more seals 46 (shown fragmented) may be embedded in a loop seal-receiving channel(s) 45 on the continuous surface of the wiper arm 40. In an embodiment, the seal(s) 46 are O-rings, wiper seals or the like seals that circuit about the periphery of the wiper portion 44 (free end) and the lateral sides (comprising the radial surface portions) of the tubular portion 41, and thus contact the circumferential surface portion 31 and the end plates 14. Accordingly, the seal(s) 46 sealingly isolates the shaft 18 and the outer and lateral surfaces of the wiper arm 40. In the illustrated embodiment, a pair of the seals 46 would be required, but one or more seals 46 may be present, depending on the number of loop channels 45. The seal(s) 46 on the wiper arm 40 can be made of any appropriate material, such as an elastomer, synthetic materials, metallic materials or any other product or combination of products. It is observed that the loop channels 45 may extend from the tubular portion 41 to the wiper portion 44. Consequently, the precise positioning of the wiper portion 44 on the neck 42A is required for the loop channel 45 to be continuous, if the wiper portion 44 is separable from the tubular portion 41.

As shown in FIGS. 8 and 9, seal(s) 48 (shown fragmented) may optionally be provided in circular channel(s) on the lateral sides of the wiper arm 40. The seals 48 surround the shaft 18 and therefore define a level of sealing between the wiper arm 40 and the end plates 14 that may supplement the sealing achieved by seal(s) 46. For instance, the seals 48 may be O-rings or wiper seals of appropriate material compatible with oil. A pair of the channels 47 and seals 48 are shown, but one or more sets of channel 47 and seal 48 may be present.

According to another embodiment, the wiper arm 40 comes into contact with the circumferential surface portion 31 and the end plates 14, without the presence of the seal(s) 46 and 48, though in another embodiment the seals 46 and 48 preserve a gap between the wiper arm 40, the circumferential surface portion 31 and the end plates 14. In the event no seals are present, the material of the wiper arm 40 is selected to allow direct contact. For instance, bronze (and alternatives nytralon, UHMW polyethylene, etc) can be used for the metallic parts contacting one another, such as the wiper arm 40.

Referring to FIGS. 8 and 9, one or more spacers 49 may be provided on the wiper arm 40. The spacers 49 may be made of a wear material (wear spacer), such as a polymer or a metal, and may optionally come into contact with a surface of the end plates 14. The spacers 49 may act as stoppers when assembling the end plates 14 to the casing portion 12, thus forming physical stops indicating to a user that the tightening of the end plates 14 to the casing portion 12 is sufficient, so as to avoid an over-compression of the seals 46 and/or 48, if present. In a contemplated use, the spacers 49 do not contact the end plates 14, as the seals 46 and/or 48 preserve a gap and effect the oil-tight relation. The spacers 49 may be at both ends of the tubular portion 41. In an embodiment, a spacer 49 is between the loop channel(s) 45 and the circular channel(s) 47. Spacers 49 are also shown as being on the block 42, outward of the loop channel(s) 45. Other locations are considered. Fasteners 49A may be used to releasably attach the spacers 49 to the wiper arm 40 but it is also contemplated to use a force fit without any fasteners instead. Depressions may also be formed into the wiper arm 40 to precisely locate the spacers 49. The spacers 49 may be replaced when worn, as may be the wiper portion 44 (if removable), the seals 46 and 48, if present.

In use, with reference to FIG. 7, the dam 32 and wiper arm 40 separate the inner cavity 30 into two chambers, namely chambers C1 and C2, also known as wiper chambers, variable volume chambers or dam chambers. As the wiper arm 40 rotates in orientation θ, the volume of the chambers C1 and C2 varies in proportionally-opposite linear fashion. Therefore, fluid in the inner cavity 30 moves from one of the chambers C1, C2 to the other of the chambers C1, C2, passing through a hydraulic control block that may include the flow control device 33, or other means, such as the opening shown in the dam 32 in FIG. 7 (or via the holes 31A also shown in FIG. 7). The hydraulic control block is used to cause flow restrictions to oppose a force to the rotation of the shaft 18, via the wiper arm 40. The resulting torque will therefore dampen movement of the door D connected to the shaft 18 through linkage L.

As observed in FIGS. 7 to 10, the surfaces S1 and S2 of the wiper arm 40 are planar, and are at an angle β, relative to a radial plane R1 passing through a center of the wiper portion 44 (the radial plane R1 being one in which the rotational axis of the wiper arm 40 lies). Stated differently, in a variant, the planes of the surfaces S1 and S2 are not parallel to the imaginary radial plane R1. The surfaces S1 or S2 exert the force on oil in the respective chambers C1 and C2, and their orientation relative to the radial plane R1, which force may be substantially tangential, or generally tangential (e.g., ±15 degrees) relative to the rotational axis X of the shaft 18. Thus, the tapering of the wiper portion 44 in a radially outward direction, in a plane to which the rotational axis X is transverse (e.g., axial plane), contributes to maximizing the braking force on the wiper arm 40. Angle β, may be between 1 degree and 30 degrees inclusively. The tapering is optional and may not be present, whereby angle β, would be null. Stated differently, the free end of the wiper arm 40 has planar surfaces, such as S1 and S2, tapering radially outwardly relative to the plane R1 in which the longitudinal axis lies, the plane R1 passing through the wiper arm 40.

The invention claimed is:

1. An apparatus comprising:
   a casing defining an inner cavity delimited at least by a circumferential surface portion between a pair of lateral surface portions;
   a shaft passing through the inner cavity of the casing and rotatably supported to rotate about its longitudinal axis, the shaft having at least one end laterally projecting out of the casing, the at least one end of the shaft adapted to be connected to a moving part to oppose a force to given motions of the moving part;
   a wiper arm on the shaft so as to rotate with the shaft, the wiper arm having a free end in close proximity to the surface portions of the inner cavity of the casing, the free end of the wiper arm having a contour complementarily corresponding to a profile of the circumferential surface portion of the inner cavity, the wiper arm having the tubular portion mounted to the shaft, and a wiper portion projecting from the tubular portion and forming part of the free end, the wiper portion being releasably connected to the tubular portion; and
   a dam extending from the circumferential surface portion in a radial inward direction toward a center of the inner cavity of the casing in close proximity to one of the shaft and wiper arm, to divide the inner cavity in chambers adapted to accommodate a fluid, with movements of the wiper arm changing the volume of the chambers, whereby the apparatus is configured to allow the fluid to flow between the chambers to oppose the force to the given motions;
   wherein the free end of the wiper arm has planar surfaces tapering radially outwardly relative to a plane in which the longitudinal axis lies, the plane passing through the wiper arm, the planar surfaces being within concavities disrupting a cylindrical surface portion of a tubular portion of the wiper arm, and
   wherein the dam lies in the plane when the wiper arm divides the inner cavity into the chambers having equal volumes.

2. The apparatus according to claim 1, wherein the planar surfaces at an angle ranging from 1 degree and 30 degrees relative to the plane.

3. The apparatus according to claim 1, wherein the concavities includes ribs at a junction between the cylindrical surface portion of the tubular portion of the wiper arm and the planar surfaces.

4. The apparatus according to claim 1, wherein the tubular portion includes a block projecting radially, and the wiper portion is mounted onto the block.

5. The apparatus according to claim 4, wherein a male-female connection is between the tubular portion and the wiper portion.

6. The apparatus according to claim 5, wherein a neck is on the block, and the wiper portion has a cavity receiving the neck in the male-female connection.

7. The apparatus according to claim 6, wherein the neck, the block and the tubular portion are a monolithic component.

8. The apparatus according to claim 1, wherein at least one seal-receiving channel circuits from a first lateral side of the tubular portion, to an outer surface of the wiper portion, to a second lateral side of the tubular portion, to the outer surface of the wiper portion, and back to the first lateral side of the tubular portion.

9. The apparatus according to claim 1, wherein at least one seal-receiving channel circuits around the shaft in a first lateral side of the tubular portion and/or a second lateral side of the tubular portion.

\* \* \* \* \*